United States Patent Office 2,873,292
Patented Feb. 10, 1959

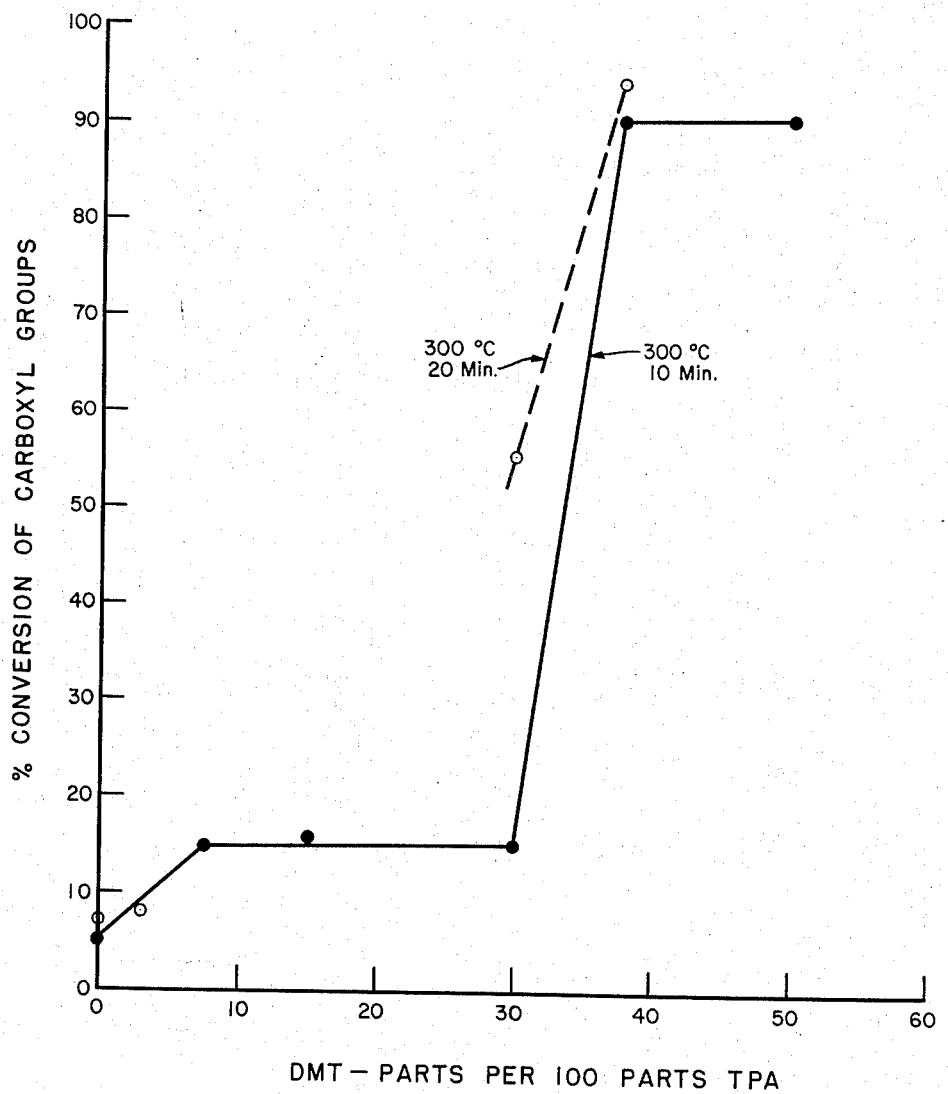
EFFECT OF ESTER IN CHARGE ON CARBOXYL GROUP CONVERSION RATE
INVENTOR.
Delbert H. Meyer

2,873,292

PREPARATION OF METHYL AND ETHYL ESTERS OF AROMATIC CARBOXYLIC ACIDS

Delbert H. Meyer, Highland, Ind., assignor to Standard Oil Company, Chicago, Ill., a corporation of Indiana Application May 31, 1957, Serial No. 662,869

7 Claims. (Cl. 260—475)

This invention relates to the preparation of the methyl or ethyl esters of aromatic carboxylic acids.

The reaction between aromatic carboxylic acids and methanol or ethanol is very slow even when a catalyst is used. In order to reduce the time needed to obtain high yields of ester, the reaction zone is operated at elevated temperatures and pressures—usually well above the critical temperature of the methanol or ethanol, such as 300° C. Under these conditions, high yields can be obtained at times suitable for batch operation, when a catalyst such as zinc or zinc oxide is present. The presence of solid catalyst in the product introduces a purification problem for the ester product. Catalysts also cause more or less wastage of alcohol to an ether side-reaction product.

An object of the invention is a rapid process for the preparation of the methyl or ethyl esters of aromatic carboxylic acids, particularly of aromatic dicarboxylic acids. Another object is a rapid, non-catalytic process for esterifying aromatic carboxylic acids with methanol or ethanol, operating above the critical temperature of the alcohols. A further object is a continuous process for preparing esters from methanol or ethanol and aromatic carboxylic acids. A particular object is a rapid process for preparing in high yield dimethylterephthalate from methanol and terephthalic acid operating above the critical temperature of methanol. Other objects will become apparent in the course of the description of the invention.

The figure shows results of operation at fixed conditions except for the amount of added ester.

When an aromatic carboxylic acid and methanol or ethanol are contacted at a temperature substantially above the critical temperature of the alcohol, the rate of reaction of the acid and the alcohol is very slow, even when using a catalyst. Even at high temperatures on the order of 325° C., the time to attain about the equilibrium conversion of carboxyl groups is impractically long for continuous operations. It has been discovered that the reaction rate can be accelerated, when operating substantially above the critical temperature of the alcohol, by contacting the acid and the alcohol in the presence of added ester of the type which is producible by the defined reactants. A significant improvement in reaction rate is obtained by having present about 10 parts by weight of added ester per 100 parts of acid charged to the reaction zone. At a given temperature, pressure and proportion of acid and alcohol, the reaction rate is abruptly and vastly increased by the presence of a particular amount of ester; in general there is no need to use more than about 50 parts by weight of added ester per 100 parts of acid charged.

The alkyl-group affording alcohols used in the process of the invention are either methanol or ethanol. The critical temperatures of methanol and ethanol is 240° C. and 243.1° C., respectively.

The process may utilize all aromatic carboxylic acids or anhydrides thereof. Examples of suitable aromatic carboxylic acids and anhydrides are: benzoic, toluic, phthalic, phthalic anhydride, isophthalic, terephthalic, trimesic, trimellitic, trimellitic anhydride, hemimellitic, hemimellitic anhydride, prehnitic, mellitic, naphthoic, naphthalic anhydride, diphenic, and diphenic anhydride. The invention is particularly adapted to the preparation of methyl and ethyl esters of the various phthalic acids, which term includes phthalic anhydride.

Although only 1 mol of alcohol is theoretically required for each mol of carboxyl groups desired to be esterified the degree of conversion and the rate is improved by the use of excess alcohol. In general between about 2 and 30 mols of alcohol are present per mol of carboxyl groups in the reaction zone.

When charging alcohol and phthalic acid, between about 3 and 50 mols of alcohol are usually used per mol of acid. In the case of methanol and terephthalic acid or isophthalic acid, it is preferred to use between about 2 and 5 parts by weight of methanol per part of acid; this corresponds to between about 10 and 26 mols of methanol per mol of acid.

The esters added to the esterification reaction zone preferably contain the same type of acid nucleus as the acid reactant charged to the process and the same type of alkyl group as the alcohol reactant charged to the process. To illustrate: when reacting ethanol and benzoic acid, the ester is preferably ethylbenzoate; when reacting methanol and terephthalic acid, the ester is preferably a methylterephthalate. When the acid reactant is a polybasic acid, the added ester may be an acid-ester or the complete ester. To illustrate: when reacting methanol and terephthalic acid, the added ester may be monomethylterephthalate or dimethylterephthalate. When using an acid-ester as the added ester, enough alcohol should be charged to completely esterify the added ester as well as the acid reactant. It is preferred to use the complete ester as the added ester.

The added ester is present in the reaction zone in an amount of at least about 10 parts by weight per 100 parts of aromatic carboxylic acid charged thereto. At a fixed operating condition, the presence of this amount of added ester will result in a marked increase in yield of product ester. It appears that, at fixed operating conditions, the yield advantage over no added ester increases abruptly and vastly. The point at which the abrupt increase in rate, or yield in a fixed time of contacting takes place depends somewhat on the reactants charged, the temperature, and pressure in the reaction zone. Thus when charging terephthalic acid (TPA) and methanol, in a weight ratio of alcohol to acid of 3, in excess of 90% of the carboxyl groups were esterified in 10 minutes at 300° C. and 2000 p. s. i. when about 37 parts of dimethylterephthalate was present in the charge; this is compared to about 15% conversion at 8–30 parts.

At the break-point, the reaction proceeds to substantially the equilibrium conversion so rapidly that there is little to be gained, rate-wise, in using more than the break-point amount of added ester. Under the conditions of the usual very large excess of alcohol used, there is no disadvantage, except economic, to the use of amounts of added ester greater than the break-point amount.

For economic reasons, it is customary to carry on the reaction for a time such that substantially equilibrium conversion of carboxyl groups present in the contacting zone is attained—this means that generally 90% or more of the carboxyl groups are converted. The use of amounts of added ester less than the break-point amount permits attaining equilibrium conversion in times markedly less than when no added ester is used. The effect of time on the degree of conversion is shown in the data on terephthalic acid and methanol reaction at 300° C. and 2000 p. s. i. where at 30 parts of DMT per 100 parts of TPA the conversion jumped from 15% to 10 minutes to 55% in 20 minutes.

When using phthalic acids and methanol, and DMT as the added ester, it is preferred to have present between about 35 and 40 parts of DMT per 100 parts of TPA charged; the preferred temperature and time for this system, to reach equilibrium, is about 300° C. and about 10 minutes.

The process is carried out at a temperature substantially above the critical temperature of the methanol or ethanol reactant. In general the temperature will be at least on the order of 260° C. Higher temperatures decrease the total time needed to reach equilibrium conversion. Temperatures of as much as 350° C. may be used. It is preferred to operate in the region of 275°–325° C. as these temperatures give reasonable rates and permit good control of the temperature.

The process may be carried out at the superatmospheric pressure determined by the vapor pressure of the alcohol at the reaction temperature, or higher imposed pressures may be used. It is thought that pressure has a bearing on the break-point amount of added ester and the time for reaching equilibrium conversion at a given amount of added ester. It is believed the added ester dissolves acid and alcohol and provides a liquid reaction medium thereby permitting very rapid reaction rates. The amount of alcohol dissolved in the added ester increases with increasing pressure, at constant temperature, and therefore the esterification reaction will proceed at a greater rate, initially, than occurs when using the same amount of added ester at a lower pressure. Thus, the break-point amount of added ester decreases as the pressure on the reaction zone increases, at otherwise fixed operating conditions.

The term "added ester" is to be understood merely as a means of distinguishing the reaction-rate promoting ester from the product of the reaction of the acid and alcohol charged. The added ester may be introduced into the reaction zone before or after the alcohol and acid have been introduced thereto. The defined acid, alcohol and added ester may be introduced separately or they may be premixed. For example, the alcohol and acid may be premixed to form a slurry, or a solution, and then together charged to the reaction zone. Also the added ester and the alcohol may be mixed together and added to the reaction zone. The added ester may be already present in the reaction zone from a previous ester preparation. To illustrate: terephthalic acid and methanol may be reacted in a batch operation to produce dimethylterephthalate. The unreacted methanol may be distilled from the reaction zone; a portion of the crude DMT product may be withdrawn from the reaction zone, leaving therein the amount of DMT desired for promoting the reaction of another batch of methanol and terephthalic acid.

The process is eminently suitable for continuous operation. Continuous operation may utilize a tank-type reactor system having a sufficient holding time to provide the desired degree of conversion in a given period of time; a tube-type reaction zone may be used wherein the reactants and added ester are passed through a tube or coil having a sufficient holding time to attain the desired degree of conversion. In a continuous-type reactor the start-up operation may or may not involve the presence of added ester. The start-up operation may be carried out with only alcohol and acid until enough ester has been produced to serve the reaction promoting purpose; operation thereafter will be with ester in the charge to the reaction zone in order to get the very short reaction time needed for continuous operation. In a tank-type continuous reactor it is possible to operate in such a fashion that a "pool" of methanol, acid and ester is maintained therein and only alcohol and acid need be charged to the reactor as the pool of materials in the reactor afford the necessary amount of promoter ester. In such an operation a material balance around the plant would not show the addition of ester as such even though the reaction itself involves the presence of added ester. In continuous operation it is to be understood that the acid and alcohol may be intermingled and preheated to about the reaction temperature separately from the added ester and then the added ester may be introduced into the preheated mixture of acid and alcohol, with the total materials then being passed through the reaction zone. In a continuous operation, or in a batch operation wherein ester is permitted to remain in the reactor at the end of each batch, the weight ratios of added ester to acid charged to the reaction zone are internal ratios of materials actually present in, or charged to, the reaction zone and not an external ratio of materials charged to the esterification plant. The external amounts may not show an appreciable physical addition of ester to the process at all particularly when such balances represent a prolonged period of time covering days and weeks of continuous operation.

TESTS

Studies were made on the degree of conversion of terephthalic acid and methanol at 300° C. and two different times without and with added dimethylterephthalate present in the reaction zone. These studies were carried out using as the reaction zone a 5/8 inch I. D. glass tube having about 9 ml. volumetric space. The terephthalic acid and the added DMT were weighed and the methanol was delivered volumetrically using a hypodermic syringe. The glass tube was then sealed by fusing the opening. The sealed tube was placed in a constant temperature bath provided with a rocking and oscillating mechanism which mechanism kept the contents of the tube well intermingled. After the reaction zone had been agitated in the bath for the desired time it was removed from the bath and allowed to cool to room temperature. After the tube had reached room temperature it was opened and the contents transferred to a beaker; the tube was washed with 100 ml. of ethyl alcohol and 100 ml. of benzene to insure removal of all the material therefrom. The degree of conversion of the carboxyl groups to ester groups was determined by titration with 0.02 or 0.10 normal aqueous sodium hydroxide using phenol red as the indicator.

In all the tests 0.267 g. of terephthalic acid (TPA) and 0.80 g. of anhydrous methanol were charged to the reactor. The amount of dimethylterephthalate added ranged from "none" to 0.133 g. or from 0 to 50% by weight based on TPA charged, i. e., 0–50 parts by weight of DMT per 100 parts of TPA charged. In this system, the reactor pressure at 300° C. was calculated to be approximately 2000 p. s. i.

One set of tests was carried out at 300° C. and 10 minutes time and another set was carried out at 300° C. and 20 minutes time. Operating conditions and the carboxyl group conversion obtained in each test are set out in the table. The figure shows a plot of the percent conversion of carboxyl groups against the relative amount of DMT added.

The tests at 10 minutes show that the presence of 7.5 parts of DMT per 100 parts of TPA (hereinafter shown merely as "parts") increased the amount of conversion 4-fold over no added ester. Adding more ester up to 30 parts did not, within the accuracy of the procedure, change the amount of conversion. The figure shows dramatically the abrupt rise in the degree of conversion between 30 parts and 37.5 parts. At 37.5 parts (Test 5) the conversion was 90%. No significant increase was obtained at 50 parts added—this is believed to represent equilibrium conversion at this ratio of methanol to TPA and temperature. The results of Tests 1–6 are shown as the solid points in the figure.

The results of Tests 7–10 are shown as the open circles in the figure. An improvement is obtained in conversion without added DMT by doubling the time but not double the 10 minute yield. Three parts of added DMT did not significantly change the yield. At 30 parts, the yield at 20 minutes was almost 4-fold the yield at 10 minutes but still far from equilibrium which was reached at 37.5 parts. The 20 minute tests show that time helps to increase the yield obtained when the DMT added was less than the break-point amount.

Table

| Run No. | Temp., °C. | Time, Min. | Methanol, g. | TPA, g. | DMT, g. | (DMT/TPA)100 | Carboxyls Converted, Percent |
|---|---|---|---|---|---|---|---|
| 1 | 300 | 10 | 0.80 | 0.267 | None | ------ | 4 |
| 2 | 300 | 10 | 0.80 | .267 | 0.020 | 7.5 | 15 |
| 3 | 300 | 10 | 0.80 | .267 | 0.040 | 15.0 | 16 |
| 4 | 300 | 10 | 0.80 | .267 | 0.080 | 30.0 | 15 |
| 5 | 300 | 10 | 0.80 | .267 | 0.100 | 37.5 | 90 |
| 6 | 300 | 10 | 0.80 | .267 | 0.133 | 50.0 | 91 |
| 7 | 300 | 20 | 0.80 | .267 | None | ------ | 7 |
| 8 | 300 | 20 | 0.80 | .267 | 0.008 | 3.0 | 8 |
| 9 | 303 | 20 | 0.80 | .267 | 0.080 | 30.0 | 55 |
| 10 | 300 | 20 | 0.80 | .267 | 0.100 | 37.5 | 94 |

The tests show conclusively that by the "added ester" technique, very short reaction times are possible while attaining conversions in excess of 90% of the acid carboxyl groups charged. These times are short enough to permit a true continuous preparation of ester product.

Thus having described the invention, what is claimed is:

1. A non-catalytic process for making dialkylphthalates which comprises contacting a phthalic acid, an alkyl-group affording alcohol selected from the class consisting of methanol and ethanol, in a molar ratio of alcohol to acid of between about 3 and 50, at a temperature between about 260° C. and 350° C., said contacting zone containing added alkylphthalate ester in an amount between about 35 and 50 parts by weight per 100 parts of said phthalic acid reactant charged, for a time such that substantially equilibrium conversion of carboxyl groups present in the contacting zone is attained and separating dialkyl phthalate from unreacted alcohol.

2. The process of claim 1 wherein said acid is terephthalic acid.

3. The process of claim 1 wherein said acid is isophthalic acid.

4. The process of claim 1 wherein said alcohol is methanol.

5. The process of claim 1 wherein said added ester is a dialkyl phthalate having alkyl groups of the type contained in the alcohol charge and a phthalic nucleus of the type of acid charged.

6. A non-catalytic process for preparing dimethylterephthalate which comprises intermingling methanol and terephthalic acid, in a weight ratio of methanol to acid of between about 2 and 5, and dimethylterephthalate, in an amount between about 35 and 40 parts by weight per 100 parts of acid charged, at a temperature between about 275° C. and 325° C., for a time such that at least about 90% of the carboxyl groups charged are converted to methyl-ester groups, and separating dimethylterephthalate from the excess methanol.

7. The process of claim 6 wherein said temperature is about 300° C. and said time is about 10 minutes.

References Cited in the file of this patent

UNITED STATES PATENTS 2,578,312     Miller et al. _____ Dec. 11, 1951
2,618,651     Page et al. _____ Nov. 18, 1952